Patented Dec. 15, 1953

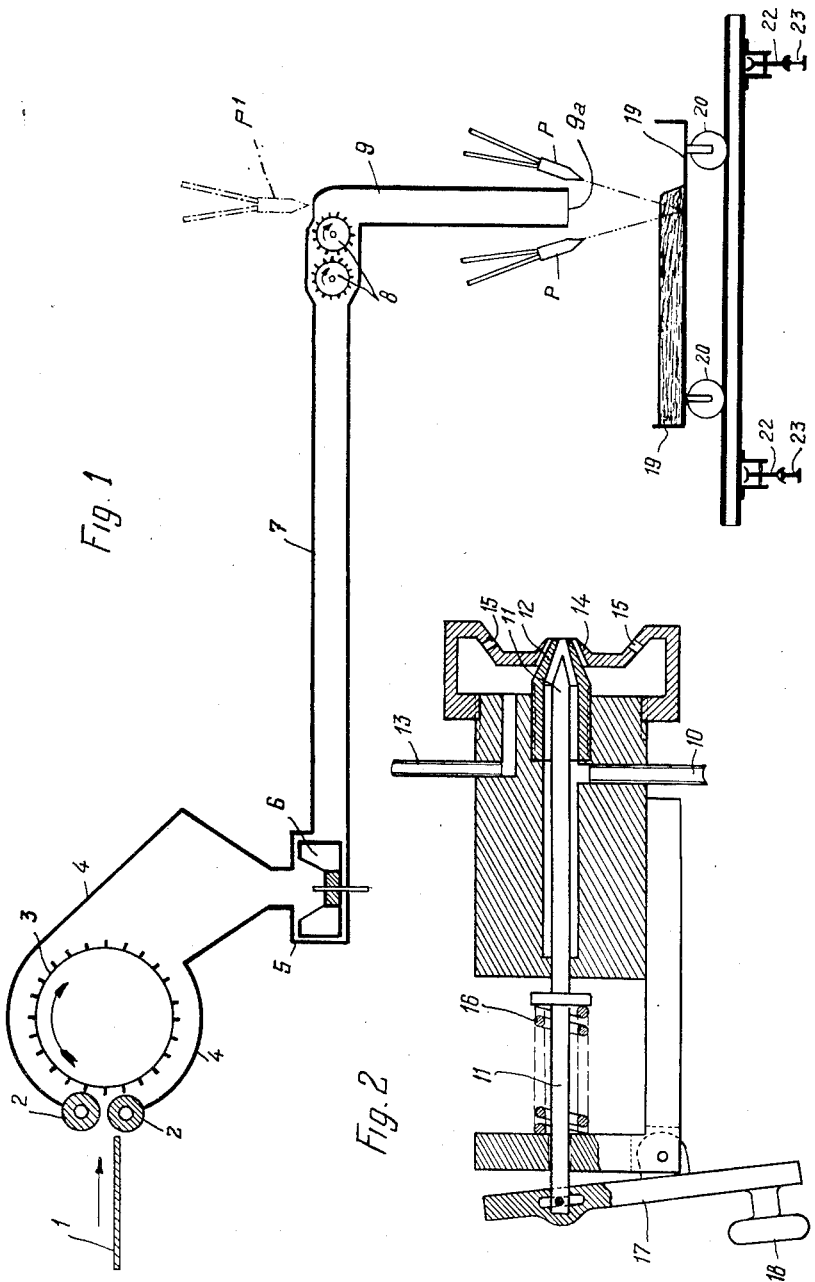

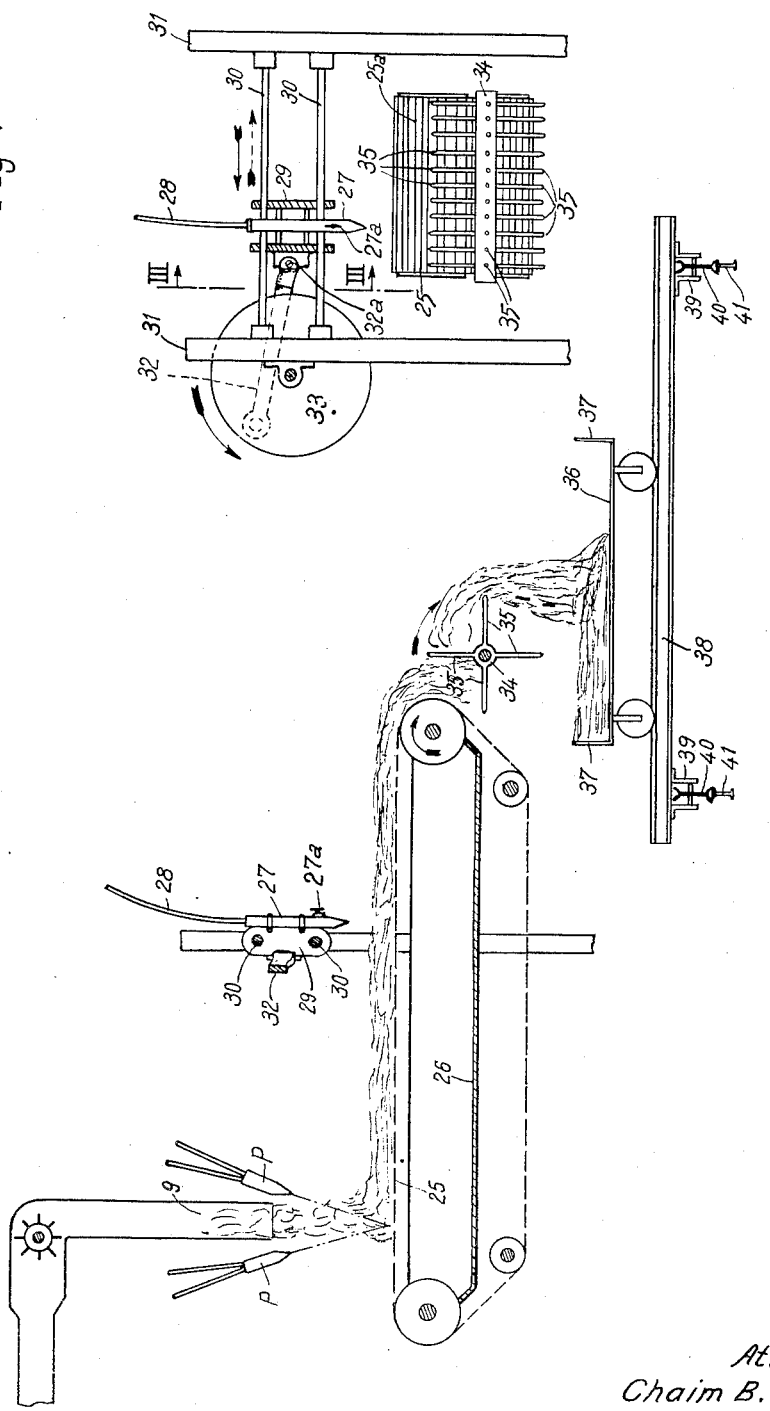

2,662,576

UNITED STATES PATENT OFFICE 2,662,576

MACHINE FOR THE CONTINUOUS MANUFACTURE OF A STUFFING MATERIAL

Chaïm Bernard Pukacz, Paris, France

Application May 13, 1952, Serial No. 287,636

Claims priority, application France May 23, 1951

5 Claims. (Cl. 154—29)

It has already been suggested to manufacture a stuffing material by means of a machine in which fibres of vegetable, animal or other origin are sprayed with latex within the outlet conduit of the machine. With such an arrangement, it may happen that fibres charged with latex adhere momentarily at some places to the walls of said conduit and this would cause irregularities in the output of the machine and above all a lack of homogeneity and an increased density of the final product, since the momentarily arrested fibres would receive a greater charge of latex than the fibres passing normally through the outlet conduit.

The invention relates to a machine for the continuous manufacture of a stuffing material by spraying latex or another adhesive substance on moving fibres which has been specially designed in order to avoid the above mentioned drawbacks.

To this effect, the machine according to the invention is chiefly characterised in that the spraying device is placed so that it projects the adhesive substance on the fibres outside the outlet conduit of the machine.

This machine may be further improved so as to drain the adhesive substance, latex or other, whereby the consumption of said substance may be reduced and a lighter product is obtained.

To this effect, an apertured endless conveyor is mounted under the outlet conduit of the machine and receives the fibres on which the adhesive liquid is sprayed, a tank for recovering part of said liquid is placed below the upper side of said conveyor, and an air blowing device is mounted above said upper side of the conveyor, means being provided for detaching from said conveyor the fibres which tend to adhere to the same and for passing said fibres on to a final receiver.

The said air blowing device is advantageously provided with means for regulating the pressure of the blown air, so that the density of the deposit of adhesive substance on the fibres may be varied at will.

The appended drawings show by way of example two embodiments of the machine according to the invention.

Fig. 1 is a schematic vertical longitudinal section of the first embodiment.

Fig. 2 is a schematic longitudinal section of a spraying device.

Fig. 3 represents part of the second embodiment, partly in elevation and partly in section on line III—III of Fig. 4.

Fig. 4 is a partial end view of the second embodiment.

On Fig. 1, the reference 1 designates a table on which are placed the raw fibres, such as the fibres of an untwisted rope.

2 are feeding rollers between which the fibres on the table 1 are pushed.

3 is a cylinder which is surrounded by a casing 4, cards the fibres and feeds them into a hopper 5 placed below, from which they are fed to a centrifugal turbine 6. The latter drives the carded fibres into a transfer conduit 7 which feeds a divider formed for example by two small cylinders 8 rotating in the same direction and carrying close-set points for dividing the tufts of fibres, so as to discharge the fibres well separated, as far as possible.

The last dividing cylinder feeds the upper end of the vertical outlet conduit 9.

Around this outlet conduit are placed the sprayers P which are arranged in circle and the nozzles of which are inclined in such manner that their axes converge in a point located on the axis of the conduit 9, outside the latter, that is to say beyond its mouth 9a, the distance between said point and said mouth being variable, according to the requirements.

The sprayers may advantageously be of the type shown on Fig. 2. The latex or other adhesive or rubber-like solution arrives through the conduit 10 and comes out between the valve-needle 11 and the inner surface of the conical nozzle 12. The air arrives through the conduit 13 and leaves on the one hand between the outer surface of said nozzle 12 and the inner conical surface of a second nozzle 14, and on the other hand through openings 15 the axes of which converge in a point located outside the sprayer. In Fig. 2 the valve-needle 11 has been shown to be actuated against the pressure of a spring 16 by a lever 17 having a handle grip 18, but it should be understood that means will be provided for actuating simultaneously the valve-needles of all the sprayers of the machine.

The air in front of the mouth 9a is thus charged by the sprayers with fine particles of latex or other adhesive solution which are deposited on the fibres which issue from said mouth.

In order to facilitate the deposit of the particles of latex or other adhesive on the fibres, it may be advantageous to impart to the fibres leaving the conduit 9 a whirling motion, which may be obtained by inclining conveniently the axis of each sprayer P with respect to the vertical radial plane passing through the axis of the conduit 9 and through the centre of the considered sprayer.

On the other hand, in order to increase the output of the machine, one may apply to the fibres, before spraying them with latex, a coagulating solution such as an aqueous solution of acetic acid, formic acid, zinc chloride, etc. This operation may be effected either by soaking the fibres in the said solution before their entry into the machine, or by spraying the said solution into the conduit 9, by means of a sprayer P¹ (Fig. 1).

The fibres charged with latex or other adhesive product may be received directly on the frame of the object to be stuffed or upholstered, such as a seat, the back of a seat, etc., or on a carriage 19 forming a movable mold of rectangular shape, on which they agglomerate as the coagulation of the adhesive proceeds. The carriage 19 can be displaced longitudinally on wheels 20 rolling on rails 21 forming a frame which can itself be displaced transversally on other wheels 22 rolling on rails 23 placed perpendicularly to the rails 21.

The thickness of the deposit of agglomerated fibres can be regulated at will and variable thicknesses can thus be obtained by displacing the carriage 19 more or less rapidly. In the same manner, it is also possible to form extra thicknesses, particularly at one edge, for example in the manufacture of the upholstery for a cushion or a bench or sofa.

Instead of a rectangular mold, one may also use a platform having only longitudinal raised edges, so that the final product is obtained in the shape of a continuous band.

In Fig. 3, the reference 9 again designates the outlet conduit of the machine around which are placed the sprayers P of adhesive liquid.

Below the conduit 9 and sprayers P is mounted an endless conveyor 25 which is apertured so as to give passage to drops of the adhesive liquid which are received in a tank 26 placed under the upper side of the conveyor 25. The latter may advantageously be constituted by metal rods 25a forming a ladder chain.

Above the upper side of the conveyor 25 is mounted a compressed air blowing device which, in the present example, is a blowing nozzle 27 fed through a tube 28 and advantageously provided with a regulating valve 27a.

The blowing nozzle 27 is displaced alternatively across the conveyor so as to act upon the whole surface of the band of fibres passing on this conveyor, this in case the conduit 9 has a rectangular section, with the longer side thereof extending perpendicularly to the plane of Fig. 3.

To this effect, the blowing nozzle 27 may be mounted for example on a support 29 which slides on guide bars 30 carried by standards 31, the support 29 being reciprocated by a rod 32 hingedly connected at 32a to said support and driven by a wheel 33.

By adjusting the valve 27a, one controls the pressure of the compressed air and consequently the degree of draining of the adhesive liquid, whereby the density of the deposit of said liquid on the fibres may be varied at will. The fibres are detached from the conveyor, for example by means of a rotating urchin 34 with spikes 35 which is conveniently placed lower than the end of the conveyor.

The fibres impregnated with latex or other adhesive then fall upon the final receiver which is in the shown embodiment a platform carriage 36 having longitudinal raised edges 37 extending perpendicularly to the plane of Fig. 3. This platform carriage is movable on rails 38 in the direction parallel to the length of the conveyor 25 so that the band of fibres delivered by the latter covers the width of the platform. The rails 38 are mounted on a frame which is provided with wheels 40 and is intermittently moved on other rails 41 which are perpendicular to the rails 38.

There is thus finally obtained a band of stuffing material having a width equal to that of the platform 36 between the raised edges 37.

It will be understood that the invention is not limited to the embodiments which have been described and shown, but covers also variations thereof, within the scope of the appended claims.

I claim:

1. A machine for the continuous manufacture of a stuffing material by spraying an adhesive substance on moving fibres, comprising an outlet conduit for the fibres, a spraying device placed in such manner that the adhesive substance projected by said spraying device encounters the fibres emerging from the machine outside said outlet conduit, an apertured endless conveyor mounted below said outlet conduit for receiving said fibres sprayed with adhesive substance, a tank placed below the upper side of said conveyor for receiving excess adhesive substance, an air blowing device mounted above said upper side of the conveyor, means for detaching from said conveyor the fibres which tend to adhere to the same, and a final receiver for the fibres coming from said conveyor.

2. A machine as claimed in claim 1, comprising air pressure regulating means for said air blowing device.

3. A machine as claimed in claim 1, comprising means for reciprocating said air blowing device transversally with respect to said conveyor.

4. A machine as claimed in claim 1, in which said means for detaching the fibres from said conveyor comprise a rotating urchin placed lower than the end of said conveyor and above said final receiver.

5. A machine for the continuous manufacture of a stuffing material by spraying an adhesive substance on moving fibres, comprising a carding cylinder, a centrifugal turbine fed by said carding cylinder, a transfer conduit fed by said turbine, a divider mounted at the end of said transfer conduit, an outlet conduit for the fibres and a spraying device placed in such manner that the adhesive substance projected by said spraying device encounters the fibres emerging from said machine outside said outlet conduit.

CHAÏM BERNARD PUKACZ.

References Cited in the file of this patent

UNITED STATES PATENTS

| Number | Name | Date |
| --- | --- | --- |
| 1,881,346 | Beatty et al. | Oct. 4, 1932 |
| 2,255,189 | Robinson et al. | Sept. 9, 1941 |
| 2,330,360 | MacDonald | Sept. 28, 1943 |
| 2,438,471 | Ball | Mar. 23, 1948 |
| 2,562,149 | Mollring | July 24, 1951 |
| 2,578,412 | Fisher | Dec. 11, 1951 |
| 2,594,469 | Mahoney | Apr. 29, 1952 |
| 2,601,355 | Wyss et al. | June 24, 1952 |